United States Patent
Kwon

(10) Patent No.: US 10,075,831 B2
(45) Date of Patent: Sep. 11, 2018

(54) METHOD AND APPARATUS FOR TRANSMITTING AND RECEIVING DATA IN MESH NETWORK USING BLUETOOTH

(71) Applicant: LG ELECTRONICS INC., Seoul (KR)

(72) Inventor: Younghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/483,793

(22) Filed: Apr. 10, 2017

(65) Prior Publication Data

US 2017/0295455 A1    Oct. 12, 2017

Related U.S. Application Data

(60) Provisional application No. 62/321,173, filed on Apr. 11, 2016.

(51) Int. Cl.
| | |
|---|---|
| *H04W 4/80* | (2018.01) |
| *H04W 4/00* | (2018.01) |
| *H04B 7/14* | (2006.01) |
| *H04W 84/18* | (2009.01) |

(52) U.S. Cl.
CPC ............. *H04W 4/80* (2018.02); *H04B 7/14* (2013.01); *H04W 4/008* (2013.01); *H04W 84/18* (2013.01)

(58) Field of Classification Search
CPC ................. H04W 4/008; H04B 7/14
See application file for complete search history.

(56) References Cited

U.S. PATENT DOCUMENTS

| | | | | |
|---|---|---|---|---|
| 2015/0215028 | A1* | 7/2015 | Ljung | H04W 88/04 370/315 |
| 2016/0066248 | A1* | 3/2016 | Sato | H04W 76/02 370/315 |

\* cited by examiner

*Primary Examiner* — Tuan H Nguyen
(74) *Attorney, Agent, or Firm* — Birch, Stewart, Kolasch & Birch, LLP

(57) ABSTRACT

Disclosed herein are a method for performing, by a first node, a relay function in a Bluetooth mesh network and an apparatus performing the method. The method includes transmitting a first message for activating or deactivating the relay function of the first node to a plurality of neighboring nodes when a specific event is generated and activating or deactivating the relay function depending on whether a first indication message to request the activation of the relay function is received or not in a response to the first message within a first specific time from at least one of the plurality of neighboring nodes. The specific event is one of receiving a command indicating the setting of the relay function, a specific cycle, or receiving a second message for activating or deactivating the relay function from the neighboring nodes.

13 Claims, 16 Drawing Sheets

[Fig.1]
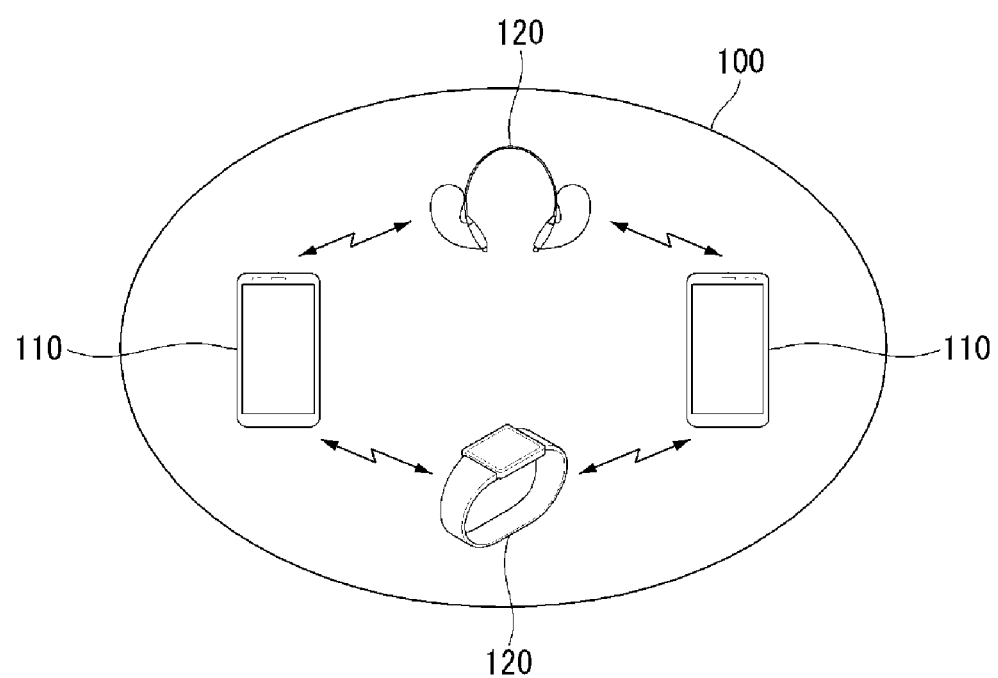

[Fig.2]
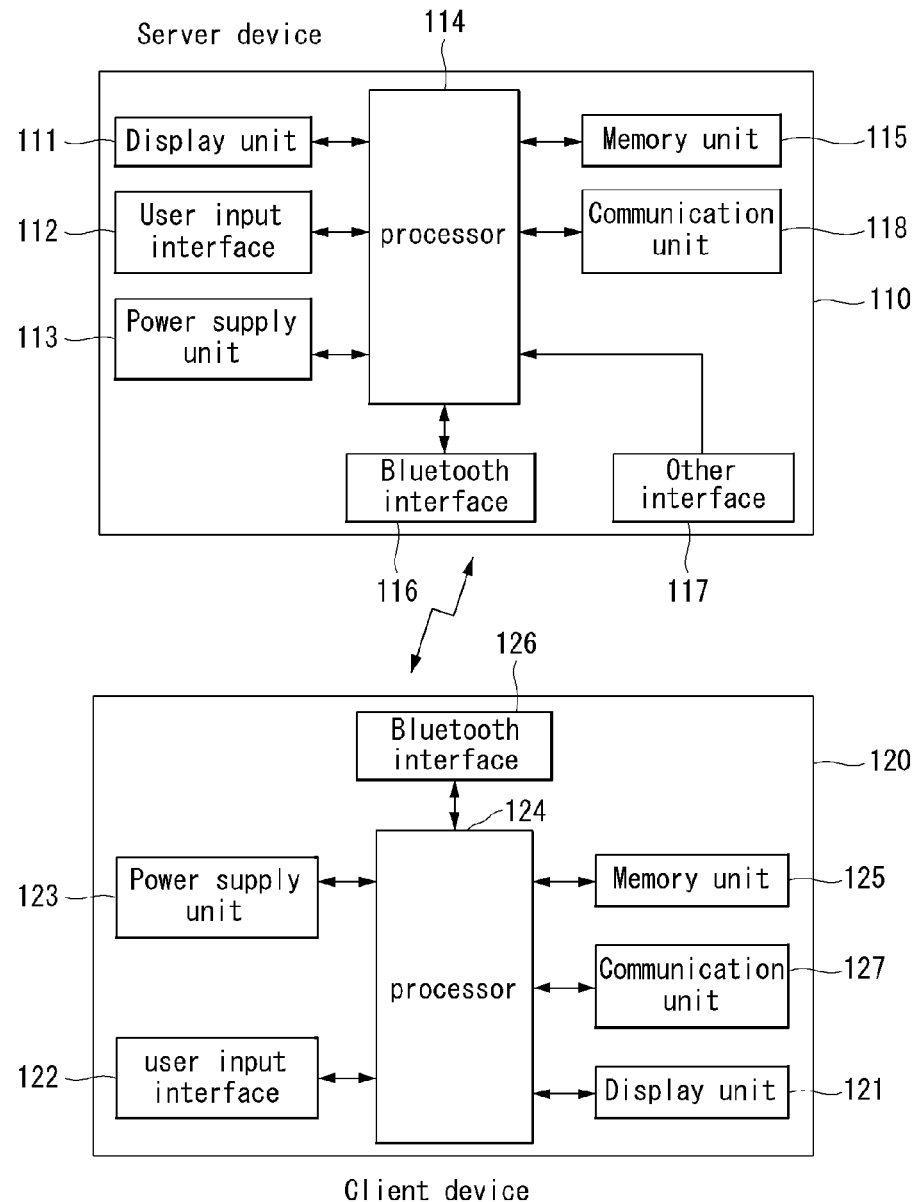

[Fig.3]
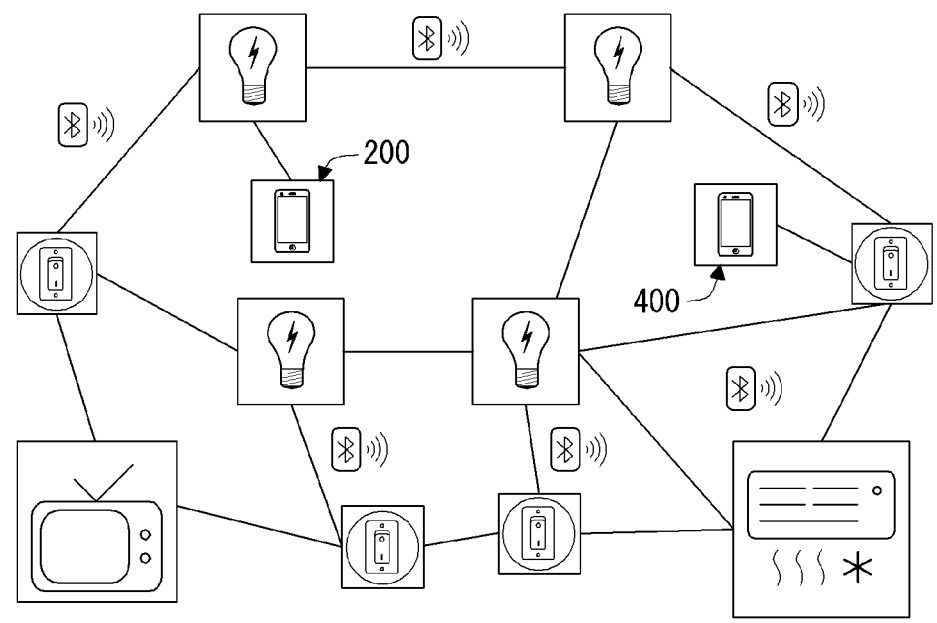

[Fig.4]
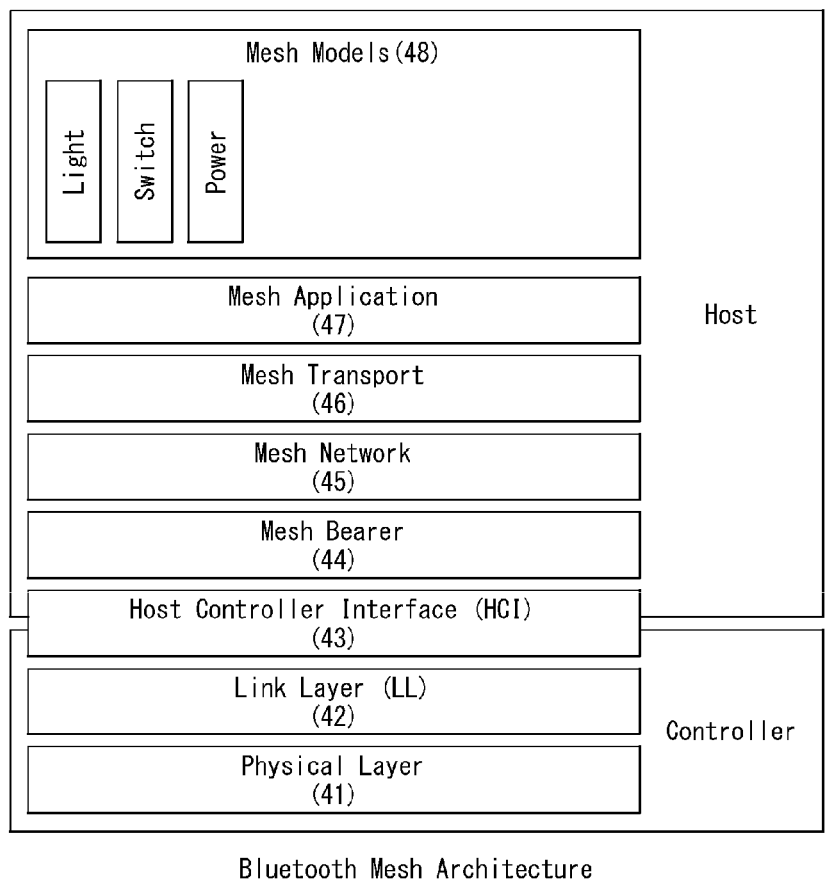
Bluetooth Mesh Architecture

[Fig.5]

| Net ID | TTL | Sequence Number | Source Address | Destination Address | Payload | |
|---|---|---|---|---|---|---|
| | | | | | opcode | Data |

Packet Format

[Fig.6]
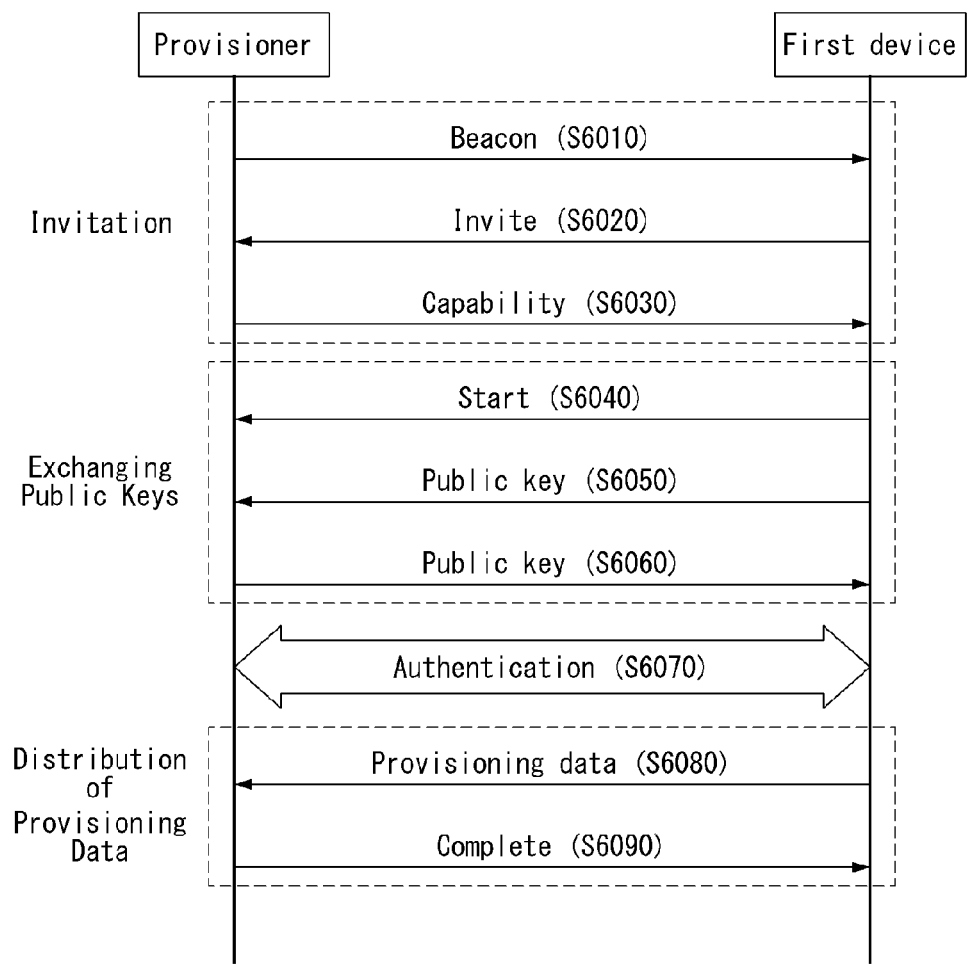

[Fig.7]
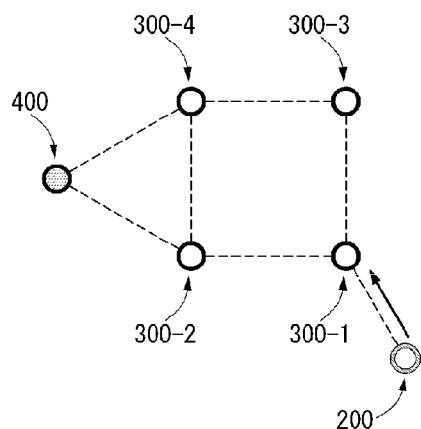
(a)
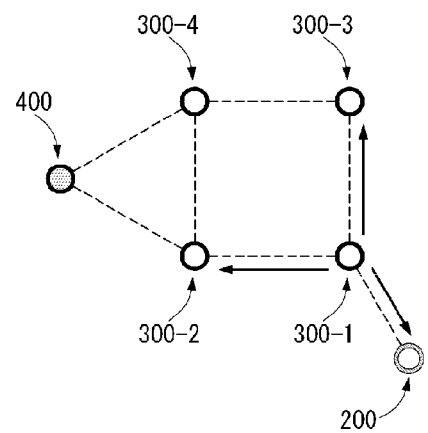
(b)
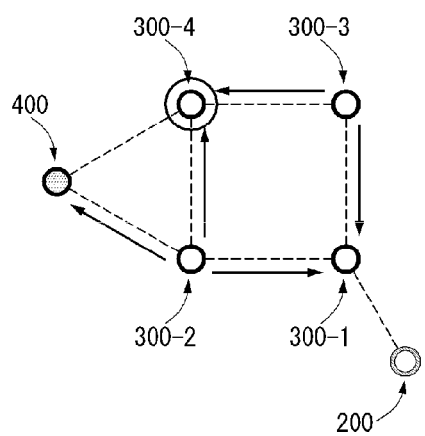
(c)
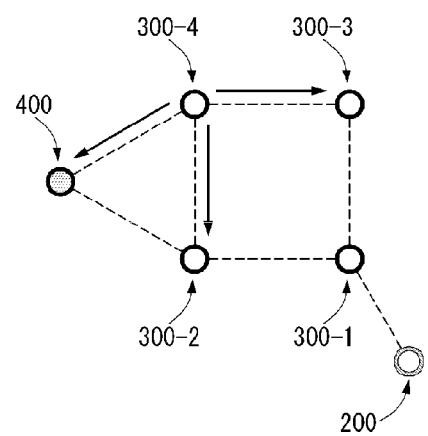
(d)

[Fig.8]
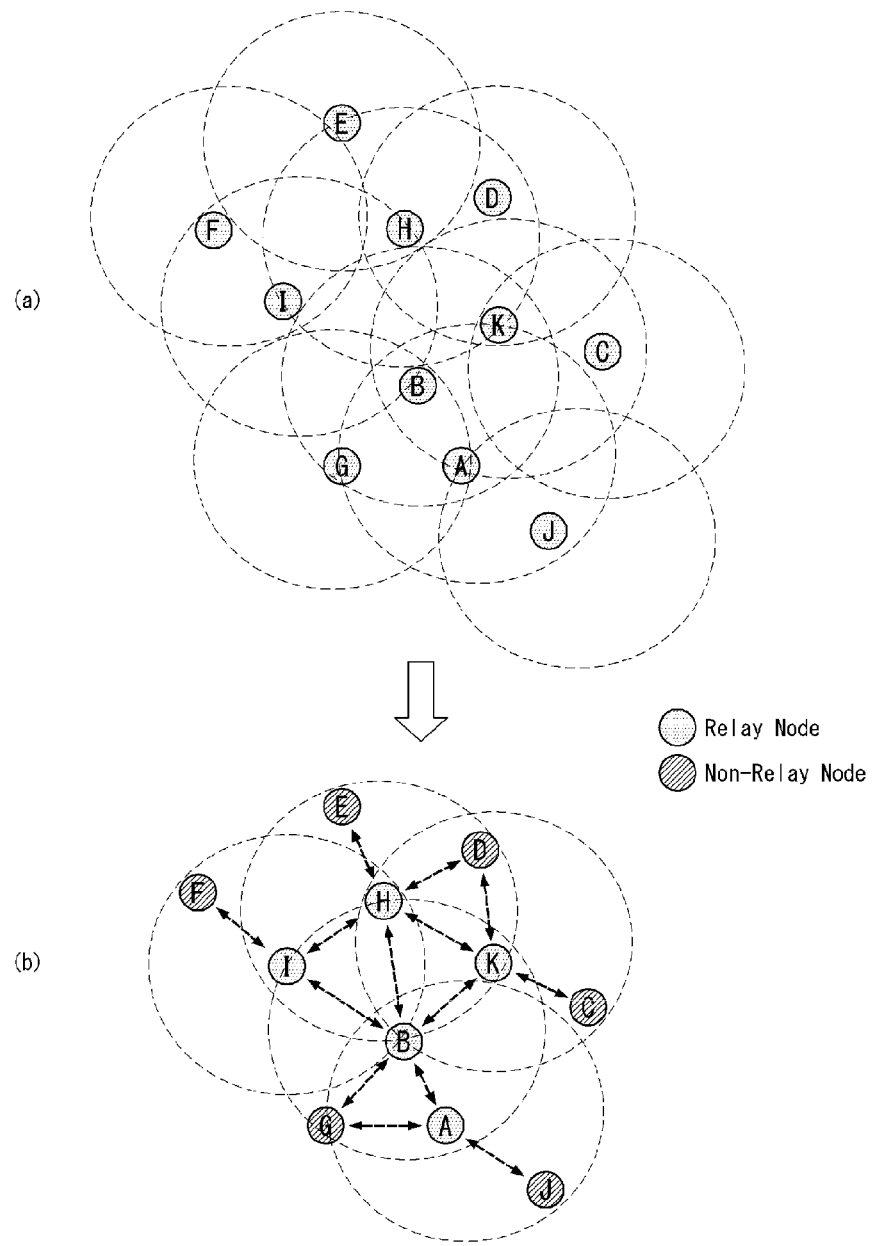

[Fig.9]
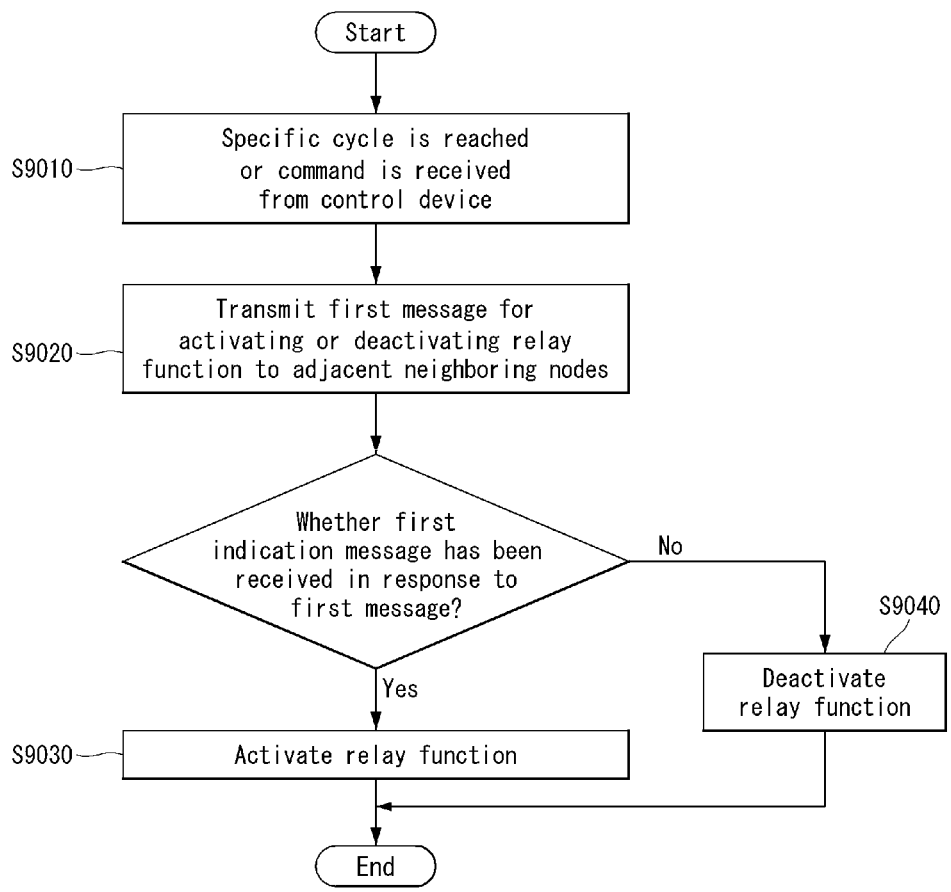

[Fig.10]
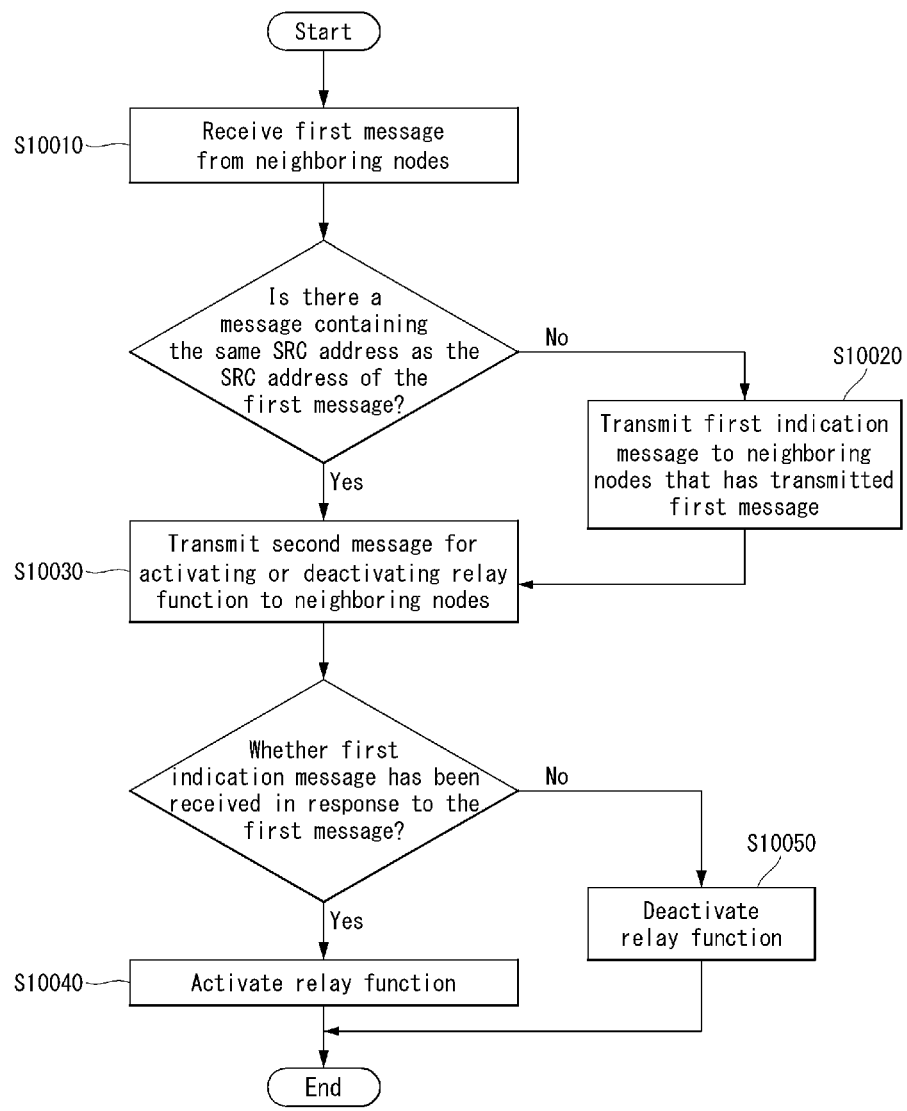

[Fig.11]
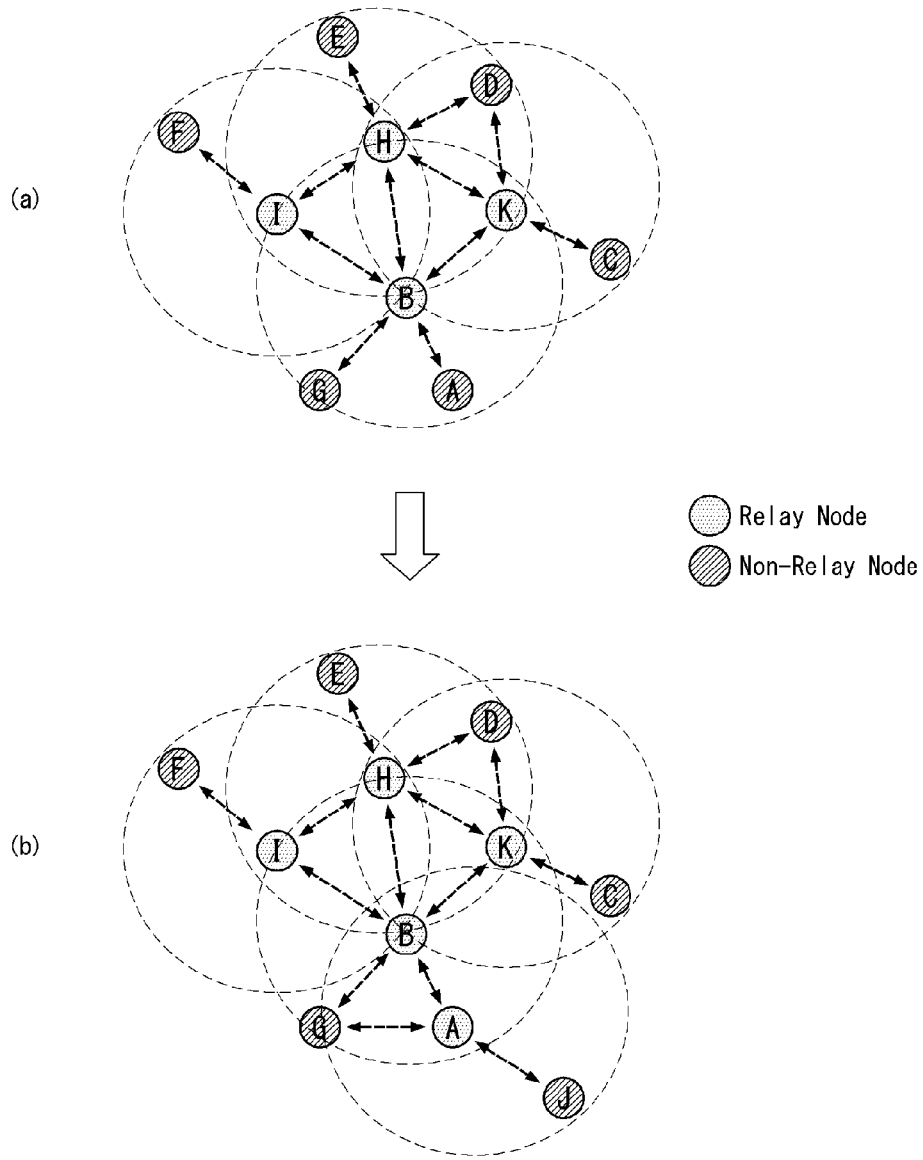

[Fig.12]
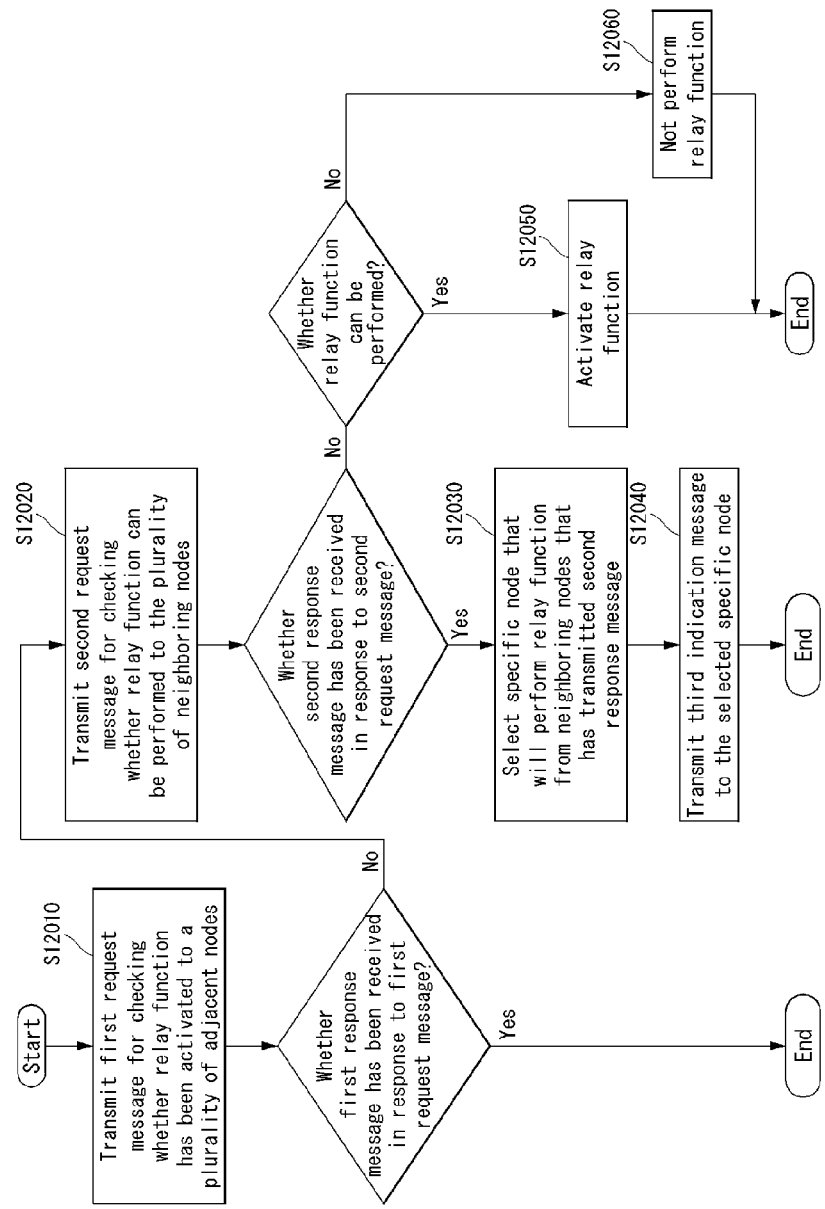

[Fig.13]
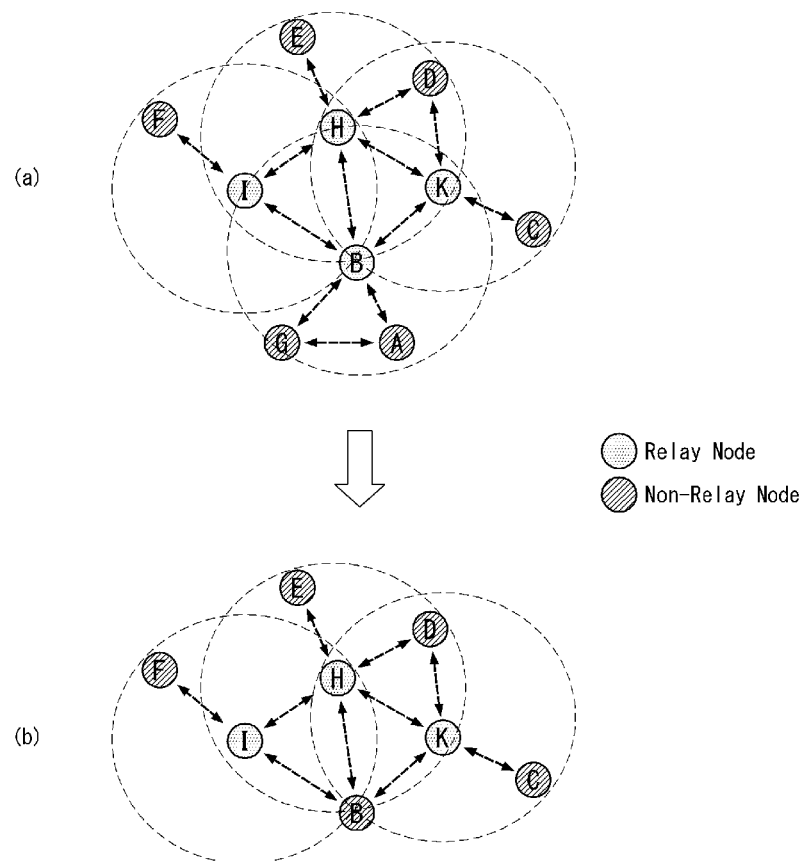

[Fig.14]
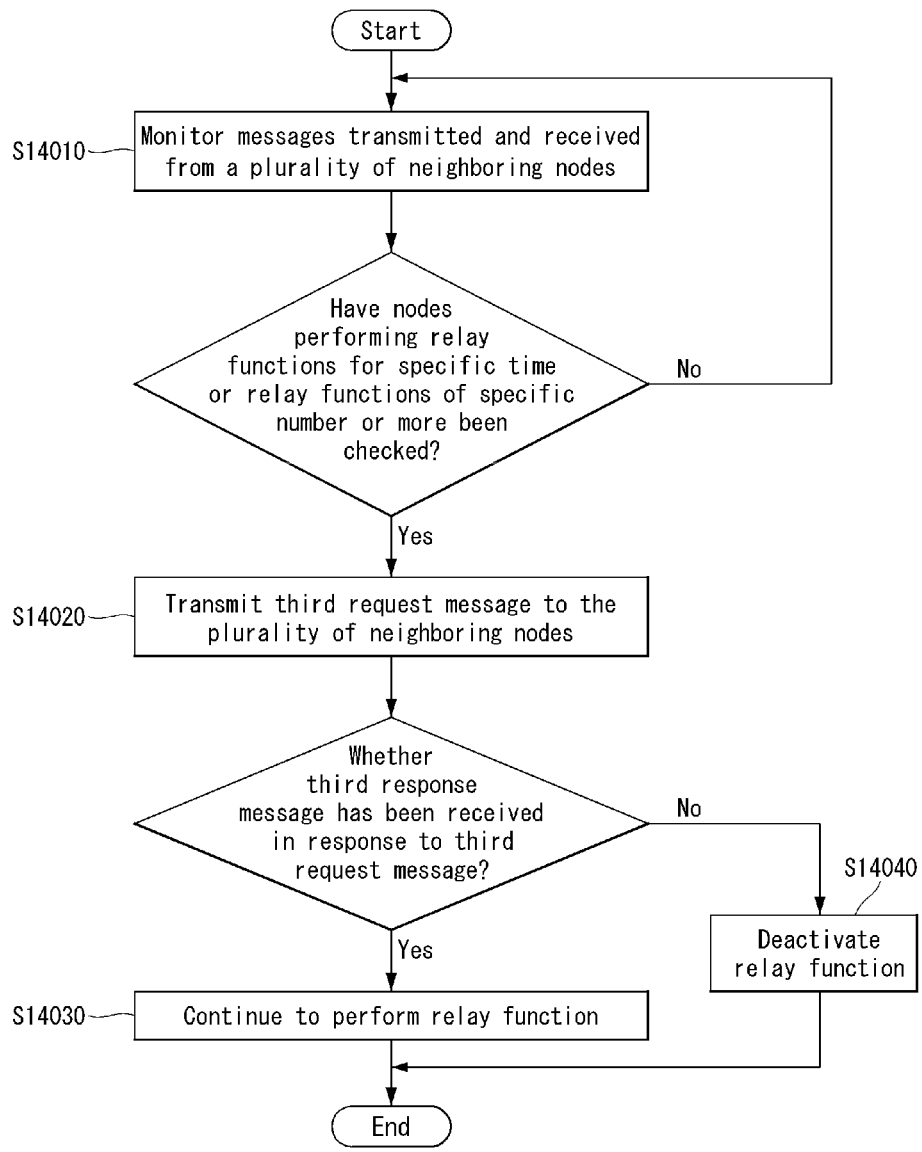

[Fig.15]
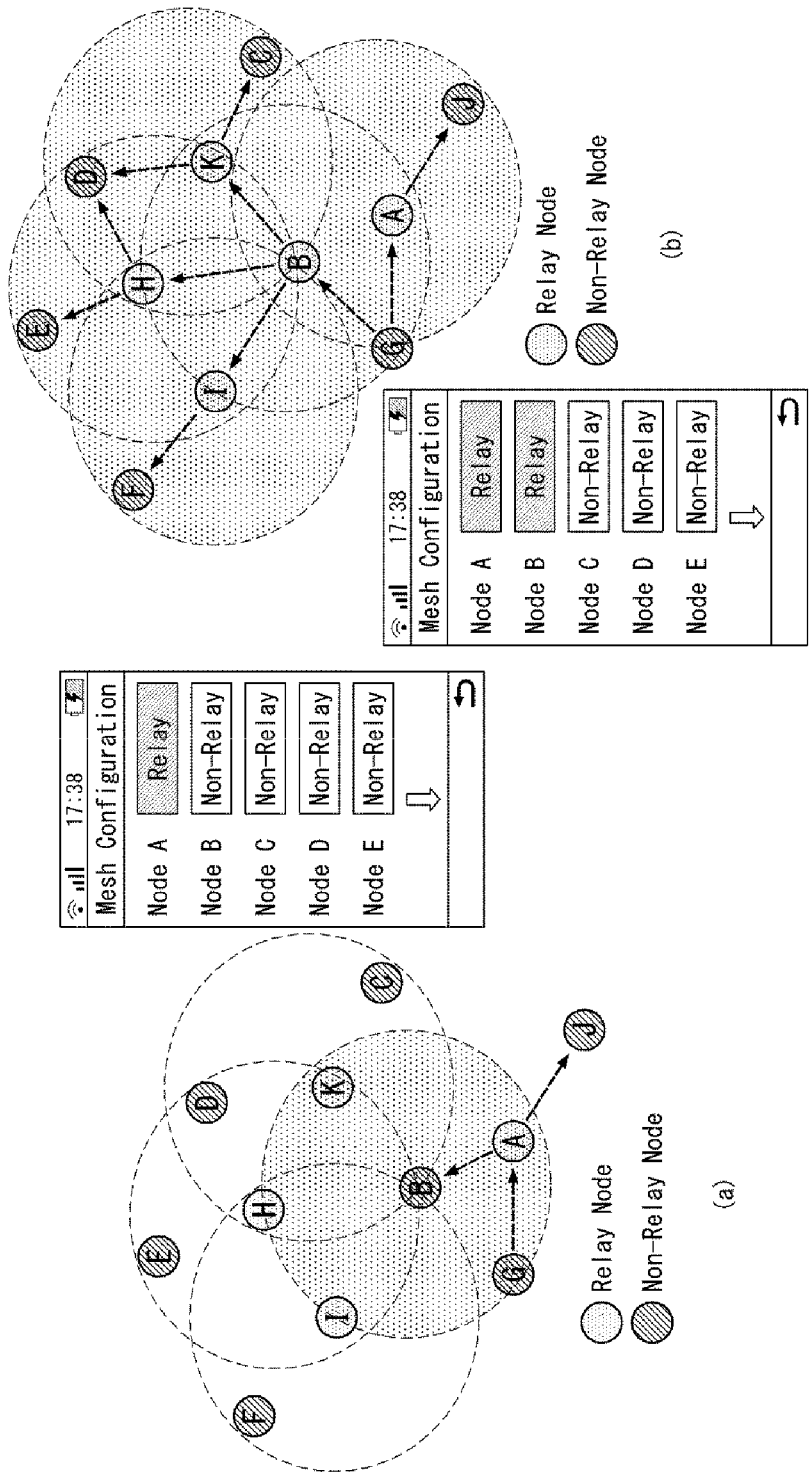

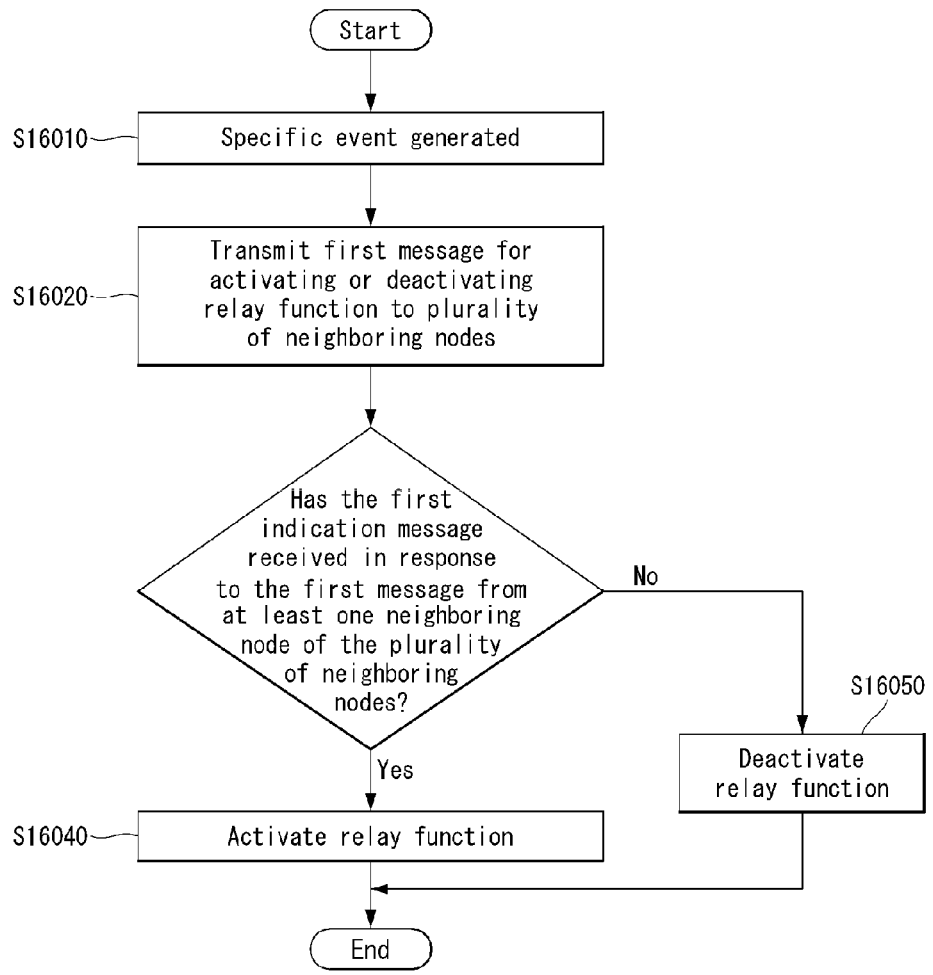

METHOD AND APPARATUS FOR TRANSMITTING AND RECEIVING DATA IN MESH NETWORK USING BLUETOOTH

CROSS-REFERENCE TO RELATED APPLICATION

This application priority to Provisional Application No. 62/321,173 filed on 11 Apr. 2016 in US, the entire contents of which are hereby incorporated by reference in its entirety.

BACKGROUND OF THE INVENTION

Field of the Invention

The present invention relates to a method and apparatus for transmitting and receiving data over a mesh network using Bluetooth, that is, a short distance technology, in a wireless communication system and, more particularly, to a method and apparatus for configuring nodes performing a relay function for data transmission and reception through a flooding method over a Bluetooth mesh network.

Discussion of the Related Art

Bluetooth is a short-range wireless technology standard that can wirelessly connect various types of devices and allows them to exchange data over short distances. To enable wireless communication between two devices using Bluetooth communication, a user has to perform the process of discovering a Bluetooth device to communicate with and making a connection request. As used herein, the term "device" refers to an appliance or equipment.

In this case, the user may discover a Bluetooth device according to a Bluetooth communication method intended to be used using the Bluetooth device, and may subsequently perform a connection.

The Bluetooth communication method may be classified as a BR/EDR method and an LE method. The BR/EDR method may also be called Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth LE technology allows devices to exchange information with each other using an attribute protocol. The Bluetooth LE method can reduce energy consumption by reducing overhead of a header and simplifying an operation.

Some of Bluetooth device products do not have a display or a user interface. In various types of Bluetooth devices and Bluetooth devices using similar technologies, the complexity of a connection, management, control, and a disconnection has increased.

Bluetooth supports a high speed with relatively low power consumption and at a relatively low cost. However, Bluetooth is appropriately used within a limited space because it has a maximum transmission distance of 100 m.

SUMMARY OF THE INVENTION

An object of the present invention is to provide a method and apparatus for transmitting and receiving data using a Bluetooth low energy (LE) technology.

Furthermore, an object of the present invention is to provide a method and apparatus for transmitting or receiving, by a node, a message through a relay node in a Bluetooth LE mesh network.

Furthermore, an object of the present invention is to provide a method and apparatus for transmitting and receiving messages using flooding in a Bluetooth LE mesh network.

Furthermore, an object of the present invention is to provide a method and apparatus for configuring nodes performing a relay function in order to transmit and receive messages using flooding in a Bluetooth LE mesh network.

Furthermore, an object of the present invention is to provide a method and apparatus for activating or deactivating the relay function of nodes through the exchange of messages between devices.

Furthermore, an object of the present invention is to provide a method and apparatus for checking whether neighboring nodes perform a relay function in a Bluetooth LE mesh network.

Technical objects to be achieved in this specification are not limited to the aforementioned objects, and those skilled in the art to which the present invention pertains may evidently understand other technological objects from the following description.

An embodiment of the present invention provides a method for performing, by a first node, a relay function in a Bluetooth mesh network.

Furthermore, in an embodiment of the present invention, the method includes transmitting a first message for activating or deactivating the relay function of the first node to a plurality of neighboring nodes when a specific event is generated and activating or deactivating the relay function depending on whether a first indication message to request the activation of the relay function is received or not in a response to the first message within a first specific time from at least one of the plurality of neighboring nodes. The specific event is one of receiving a command from the control device indicating the setting of the relay function, a specific cycle, or receiving a second message for activating or deactivating the relay function from the neighboring nodes.

Furthermore, in an embodiment of the present invention, the method may further include activating a specific timer after transmitting the first message when the specific event is one of the specific cycle or receiving the second message. The specific timer indicates a time for the retransmission of the first message.

Furthermore, in an embodiment of the present invention, the method may further include transmitting a second indication message requesting activation of a relay function to a specific neighboring node among the one or more neighboring nodes when the specific event is the reception of the second message. the specific neighboring node is a neighboring node that first transmitted the second message. the first message includes an address of the neighboring node.

Furthermore, in an embodiment of the present invention, the first node may deactivate the relay function when the first indication message is not received within the first specific time.

Furthermore, in an embodiment of the present invention, the method may further include transmitting a first request message for checking whether or not to activate the relay function to the plurality of neighboring nodes when a message is not received from the plurality of neighboring nodes within a second specific time.

Furthermore, in an embodiment of the present invention, the method may further include receiving a first response message from a particular one of the plurality of neighboring nodes indicating activation of a relay function in response to the first request message.

Furthermore, in an embodiment of the present invention, the method may further include transmitting a second request message for checking whether a relay function is capable of being performed to the plurality of neighboring nodes when a response to the first request message is not received.

Furthermore, in an embodiment of the present invention, the method may further include receiving a second response message indicating that the relay function is capable of being performed from one or more of the plurality of neighboring nodes in a response to the second request message, selecting a specific neighboring node to activate the relay function one or more neighboring nodes, and transmitting a third indication message for requesting the activation of the relay function to the specific neighboring node.

Furthermore, in an embodiment of the present invention, the method may further include activating the relay function depending on whether the relay function of the first node is capable of being activated or not if a response to the second request message is not received from one or more of the plurality of neighboring nodes.

Furthermore, in an embodiment of the present invention, the first node may activate the relay function when the first indication message is received within the specific time.

Furthermore, in an embodiment of the present invention, the method may further include obtaining information related to relay nodes with the relay function activated among the plurality of neighbor nodes through messages transmitted and received from the plurality of neighbor nodes, transmitting a third request message to the plurality of neighbor nodes based on the obtained information to inquire whether to deactivate the relay function, wherein the third request message may include addresses of the relay node, and deactivating the relay function depending on whether a third response message to request the execution of the relay function is received or not from one or more of the plurality of neighboring nodes as a response to the third request message.

Furthermore, in an embodiment of the present invention, the first node may deactivate the relay function when the third response message is not received.

Furthermore, in an embodiment of the present invention, the first terminal may perform the relay function when the third response message is received.

Furthermore, in an embodiment of the present invention, there is provided a node for performing a relay function in a Bluetooth mesh network, including a communication unit configured to communicate with an outside in a wireless or wired manner, a memory for storing data, and a processor functionally connected with the communication unit. The processor is configured to transmits a first message for activating or deactivating the relay function of the first node to a plurality of neighboring nodes when a specific event is generated and activates or deactivates the relay function depending on whether a first indication message to request the activation of the relay function is received or not in a response to the first message within a first specific time from at least one of the plurality of neighboring nodes. The specific event is one of receiving a command from the control device indicating the setting of the relay function, a specific cycle, or receiving a second message for activating or deactivating the relay function from the neighboring nodes.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a schematic diagram illustrating an example of a wireless communication system using Bluetooth LE technology to which an embodiment of the present invention may be applied.

FIG. 2 is block diagrams of devices to which an embodiment of the present invention may be applied.

FIG. 3 is a schematic diagram illustrating an example of a Bluetooth mesh network to which an embodiment of the present invention may be applied.

FIG. 4 is a diagram showing an example of a protocol stack of a Bluetooth mesh network to which an embodiment of the present invention may be applied.

FIG. 5 is a flowchart illustrating an example of a message format used in a Bluetooth mesh network to which an embodiment of the present invention may be applied.

FIG. 6 is a flowchart illustrating an example of a method through which a device joins a Bluetooth mesh network to which an embodiment of the present invention may be applied;

FIG. 7 is a diagram showing an example in which a message is transmitted using flooding over a Bluetooth mesh network to which an embodiment of the present invention may be applied.

FIG. 8 is a diagram showing an example of a method for reducing the number of relay nodes in a Bluetooth mesh network to which an embodiment of the present invention may be applied.

FIG. 9 is a flowchart illustrating an example of a method for enabling or disabling the relay function of a node to which an embodiment of the present invention may be applied.

FIG. 10 is a flowchart illustrating another example of a method for enabling or disabling the relay function of a node to which an embodiment of the present invention may be applied.

FIG. 11 is a diagram showing an example of a method for enabling the relay function of a node depending on the conditions of an neighboring node to which an embodiment of the present invention may be applied.

FIG. 12 is a flowchart illustrating an example of a method for enabling the relay function of a node depending on the conditions of an neighboring node to which an embodiment of the present invention may be applied.

FIG. 13 is a diagram showing an example of a method for disabling the relay function of a node depending on the conditions of an neighboring node to which an embodiment of the present invention may be applied.

FIG. 14 is a flowchart illustrating an example of a method for disabling the relay function of a node depending on the conditions of an neighboring node to which an embodiment of the present invention may be applied.

FIG. 15 is a diagram showing an example of a method for manually enabling or disabling the relay function of a node to which an embodiment of the present invention may be applied.

FIG. 16 is a flowchart illustrating another example of a method for enabling or disabling the relay function of a node to which an embodiment of the present invention may be applied.

DETAILED DESCRIPTION OF THE EMBODIMENTS

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, suffixes, such as 'module', 'part' or 'unit' used to refer to elements, are used to merely to facilitate the explanation of the present invention without having any significant meaning by themselves.

Hereinafter, the terms "node" and "device" are given or mixed only for convenience of description, and do not have different meanings or roles in themselves.

FIG. 1 is a schematic diagram illustrating an example of a wireless communication system using a Bluetooth LE technology to which an embodiment of the present invention may be applied.

A wireless communication system 100 includes at least one server device 120 and at least one client device 110.

The server device and the client device perform Bluetooth communication using a Bluetooth low energy (BLE) technology.

First, compared to a Bluetooth basic rate/enhanced data rate (BR/EDR), the BLE technology has a relatively small duty cycle, may be produced at a low cost, and can significantly reduce power consumption through a low data rate. Accordingly, the BLE technology may operate a year or longer when a coin cell battery is used.

Furthermore, in the BLE technology, an inter-device connection procedure is simplified and a packet size is designed to be small compared to the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other devices, and the client device may operate as a server device in a relationship with other devices. That is, in the BLE communication system, any one device may operate as a server device or a client device, or may operate as both a server device and a client device if necessary.

The server device 120 may also be called a data service device, slave device, slave, server, conductor, host device, gateway, sensing device, monitoring device or first device. The client device 110 may also be called a master device, master, client, member, sensor device, sink device, collector, second device or third device.

The server device and the client device are major elements of the wireless communication system. The wireless communication system may include elements other than the server device and the client device.

The server device refers to a device which receives data from the client device and provides data to the client device when a corresponding request is received from the client device through direct communication with the client device.

Furthermore, in order to provide data to the client device, the server device sends a notification message or an indication message to the client device. Furthermore, the server device receives a confirmation message corresponding to the indication message from the client device.

Furthermore, in the process of transmitting and receiving the notification, indication, and confirmation messages to and from the client device, the server device may provide data to a user through a display unit or receive a request from the user through a user input interface.

Furthermore, in the process of transmitting and receiving message to and from the client device, the server device may read data from a memory unit or write new data in the memory unit.

Furthermore, the single server device may be connected with a plurality of client devices and may be easily reconnected with the client devices using bonding information.

The client device 120 refers to a device which requests data and data transmission from the server device.

The client device receives data through a notification message or an indication message from the server device. When an indication message is received from the server device, the client device sends an acknowledgement message to the server device.

Likewise, in the process of transmitting and receiving messages to and from the server device, the client device may also provide information to the user through a display unit or receive an input from the user through a user input interface.

Furthermore, in the process of transmitting and receiving messages to and from the server device, the client device may read data from a memory unit or write new data in the memory unit.

Hardware elements, such as the display units, user input interfaces, and memory units of the server device and the client device will be described in detail with reference to FIG. 2.

Furthermore, the wireless communication system may configure personal area networking (PAN) through the Bluetooth technology. For example, in the wireless communication system, a private piconet may be established between devices in order to quickly and safely exchange files and/or documents.

FIG. 2 is block diagrams of devices to which an embodiment of the present invention may be applied.

As illustrated in FIG. 2, a server device includes a display unit 111, a user input interface 112, a power supply unit 113, a processor 114, a memory unit 115, a Bluetooth interface 116, other interfaces 117, and a communication unit (or transceiver unit) 118.

The display unit 111, the user input interface 112, the power supply unit 113, the processor 114, the memory unit 115, the Bluetooth interface 116, other interfaces 117 and the communication unit 118 are functionally connected to perform a method proposed in this disclosure.

Furthermore, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127 and the communication unit 128 are functionally connected to perform a method proposed in this disclosure.

The Bluetooth interfaces 116 and 126 refer to units (or modules) capable of transmitting and receiving data, such as a request/response, a command, a notification, and an indication/confirmation message, between the server and client devices.

The memory units 115 and 126 are units implemented in various types of devices in which various data is stored.

The processors 114 and 124 refer to modules for controlling a general operation of the server device or the client device and for controlling requesting the transmission of a message through the Bluetooth interface and other interfaces and processing a received message therethrough.

The processors 114 and 124 may also be called a controller or a control unit.

The processors 114 and 124 may include application-specific integrated circuits (ASIC), other chipsets, logic circuits and/or data processors.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Furthermore, after the Bluetooth LE connection is established through the connection procedure, the processors 114 and 124 control the communication units to read or write data by using an attribute protocol from the server device The memory units 115 and 125 may include read-only memory (ROM), random access memory (RAM), flash memory, a memory card, a storage medium and/or other storage devices.

The communication units 118 and 127 may include baseband circuits for processing a wireless signal. When an embodiment is implemented by software, the aforementioned technique may be implemented as a module (process, function, etc.) for performing the aforementioned function. The module may be stored in the memory unit and may be executed by the processor.

The memory units 115 may be present inside or outside the processors 114 and 124 and may be connected to the processors 114 and 124 through various well-known units.

The display units 111 and 121 refer to modules for providing information about the state of the devices and message exchange information to the user through a screen.

The power supply units 113 and 123 refer to modules for receiving external power and internal power and providing power for the operation of elements under the control of the processor.

As described above, the BLE technology has a small duty cycle and can remarkably reduce power consumption through a low data rate.

The input units 112 and 122 refer to modules which provide user input through a screen button, for example, to the controller such that the user can control device operation.

FIG. 3 is a schematic diagram illustrating an example of a Bluetooth mesh network to which an embodiment of the present invention may be applied.

As illustrated in FIG. 3, the Bluetooth mesh network refers to a network over which multiple devices are connected like a mesh through Bluetooth in order to transmit and receive data.

The Bluetooth mesh network includes relay nodes for relaying messages between a source device 200 that sends data and a destination device 400 that receives data.

Alternatively, the Bluetooth mesh network may include edge nodes 200 and 400 and relay nodes.

As used herein, the term "node" refers to a device that form a mesh network, and the terms "node" and "device" may be interchangeably used.

Each node has a message cache for recently received messages. If a received message is already in the message cache, it is not relayed any longer.

However, if a received message is not in the message cache, it is relayed and stored in the message cache.

The edge node is usually supplied with its power from a battery. The edge node is in a sleep state at normal times and may wake up for interaction or periodically.

The edge node may handle a received message if the following conditions are met:

The message is not in the message cache.
The message is authenticated by a known network key.
The destination of the message is the edge node's unicast address, a broadcast address or group address to which the edge node belongs.

A relay node is usually a device that draws main power, which is always awake and transmits received data for other nodes.

The relay node may retransmit a received message to other nodes if the following conditions are met:

The message is not in the message cache.
The message is authenticated by a known network key.
The field (e.g., relay value) indicating whether to relay the message has a value that permits relaying.
The destination address is not a unicast address assigned to the relay node.

Bluetooth mesh networks may use either a flooding technique or a routing technique, depending on how relay nodes transmit data.

In the routing technique, the source device 200 sends a message to a particular relay node, and the particular relay node, upon receiving the message, transmits the message based on information on another relay node or the destination device 400 to which the message is to be retransmitted.

The routing technique uses a broadcasting channel or point-to-point connection so as to receive and retransmit messages.

A routing device that receives a message using the routing technique determines the best routing route (s) along which the message is to be sent to an intermediate device or destination device, and determines which route to take to send the message based on a determined routing table.

With routing, however, messages need to maintain their routing tables when they are sent. Thus, the routing technique becomes more complex and requires more memory as the number of messages increase. Furthermore, the routing technique is less dynamic and more difficult to implement than the flooding technique, but offers good extensibility.

The flooding technique refers to a technique in which relay nodes receive a message and transmit it over the air via radio waves having the characteristic of propagating into the air in all directions.

That is, the source device 200 sends a message to relay nodes via broadcast channels, and the relay nodes receive and forward the message to neighboring relay nodes so that it is delivered to the destination device 400.

The flooding technique uses a broadcast channel to receive and retransmit messages, thus extending the transmission range of messages.

A mesh network using the flooding technique is a dynamic network. In the mesh network using the flooding technique, a device can receive and transmit (or retransmit) a message at any time as long as its density allows it.

The flooding technique is easy to implement, but may have extensibility issues that arise from an extended network because messages are sent with no direction.

That is, in the mesh network using the flooding technique, when a device sends a message, multiple devices receive the message and forward the received message to other devices.

Unlike the routing technique, the flooding technique enables the transfer of a message easily without the cost of constructing a routing table, but increases network traffic because all relay devices that receive the message retransmit it.

To avoid this, the number of devices on the mesh network may be adjusted between 100 and 1,000, and the exact number of devices may be determined by a number of factors.

For example, the number of devices may be determined by network capacity, traffic loads of data sources, network latency and reliability requirements.

In the present specification, the hop refers to a link between devices in the Bluetooth mesh network. That is, a link established between a source device and a relay device, a link established between relay devices, a link established between a relay device and a destination device and a link established between a source device and a destination device may be called hops.

FIG. 4 is a diagram showing an example of a protocol stack of a Bluetooth mesh network to which an embodiment of the present invention may be applied.

Referring to FIG. 4, the protocol stack of a Bluetooth mesh network may include a controller stack and a host stack on the basis of a host controller interface (HCI) 43.

The controller stack includes a physical layer (PHY) 41, a link layer (LL) 42, and the host controller interface 43.

The PHY (i.e., wireless transmission and reception module) 41 is a layer for transmitting or receiving a radio signal of 2.4 GHz, and uses a Gaussian frequency shift keying (GFSK) modulation scheme and a frequency hopping scheme including 40 RF channels.

The link layer 42 that functions to transmit or receive a Bluetooth packet performs an advertising and scanning function using three advertising channels, generates a connection between devices, and provides a function for exchanging data packets of a maximum of 257 bytes through 37 data channels.

The host controller interface 43 provides an interface between the host stack and the controller stack so that a host can provide a command and data to a controller and the controller can provide an event and data to the host.

The host stack may include a mesh bearer 44, a mesh network 45, a mesh transport 46, a mesh application 47, and mesh models 48.

The mesh bearer 44 defines a method for transmitting a mesh packet based on the PHY layer 41 and the link layer 42 of Bluetooth.

The mesh network 45 performs a function for providing a network function mesh packets that are transmitted and received through the Bluetooth mesh bearer 44.

The mesh transport 46 defines an encryption and authentication function for the end-to-end transmission of a mesh.

The mesh application 47 defines an application function of a Bluetooth mesh.

The mesh models 48 defines profiles which may be provided over a Bluetooth mesh network.

FIG. 5 is a flowchart illustrating an example of a message format used in a Bluetooth mesh network to which an embodiment of the present invention may be applied.

As shown in FIG. 5, a packet transmitted or received over a Bluetooth mesh network may include a Net ID field, a TTL field, a Sequence Number field, a Source Address field, a Destination Address field, and a Payload field.

Each of the fields may be defined as follows.

Net ID: the ID of a Bluetooth mesh network

TTL: information about a hop number by which a Bluetooth packet can be transmitted, and it is reduced when relay is performed through a node.

Source Address: the address of a node that has generated a packet.

Destination Address: the address of a node that must finally receive a packet.

Sequence Number: a value indicative of the sequence of packets generated, and it has a different value for each packet.

Payload: a field in which the data of a packet is included, and it includes an OpCode field including OpCode indicative of a unique value assigned to each command and a data field including data.

FIG. 6 is a flowchart illustrating an example of a method through which a device joins a Bluetooth mesh network to which an embodiment of the present invention may be applied.

A new device or a device that is not provisioned should perform a provisioning procedure in order to join a mesh network.

The provisioning procedure means a procedure of authenticating the device which is not authenticated, and providing the basic information (e.g., a unicast address or all of keys) for participating in the mesh network.

That is, the provisioning procedure is a procedure for a Provisioner in the mesh network to provide the information for participating in the mesh network, and the first device may acquire the address of network, keys and various types of information for operating as a part of device indicators and the mesh network.

The provisioning procedure includes Invitation Step, Exchanging public key Step, Authentication Step and Distribution of Provisioning Step.

The provisioning procedure may be performed through various types of bearers. For example, the provisioning procedure may be performed by an advertising-based bearer, a Mesh Provisioning Service-based bearer or a Mesh-based bearer.

The advertising-based bearer is a bear which is essentially established, and if the advertising-based bearer is not supported or the provisioning data is unable to be transmitted through the advertising-based bearer, the Provisioning Service-based bearer or the Mesh-based bearer may be used for the provisioning procedure.

The Provisioning Service-based bearer means a bearer for exchanging the provisioning data through the GATT protocol of the existing Bluetooth LE, and the Mesh-based bearer means a bearer for exchanging the provisioning data through the mesh network if the first device and the second device are existed in the distance for directly exchanging data.

Subsequently, the establishing procedure for the advertising-based bearer will be described.

After the bearer is established between the first device and the second device, the first device may be provisioned through the provisioning procedure below.

Invitation Step

The invitation step is started while the second device scans the first device. The first device transmits a beacon message to the second device at step S6010. The beacon message includes the UUID of the first device.

The second device that scans the first device through the beacon message transmits an Invitation message to the first device at step S6020.

The invitation message is a message for asking whether the first device performs the provisioning procedure. In the case that the first device does not want to perform the provisioning procedure, the first device ignores the invitation message.

However, if the first device wants to perform the provisioning procedure, that is, to participate in the mesh network, the first device transmits a capability message to the second device at step S6030.

The capability message may include information about whether the first device supports a security algorithm configuration, a public key, information about whether or not to output a value to a user, and information about whether or not to receive an input value from a user.

Exchanging Public Key Step

Thereafter, the second device transmits a start message for starting the provisioning to the first device at step S6040.

If a public key cannot be used through an out-of-band technology, the first device and the second device exchange public keys at steps S6050 and S6060.

However, if a public key can be used through the out-of-band technology, the second device transmits an ephemeral public key to the first device, and reads a static public key from the first device using the out-of-band technology.

Thereafter, the second device authenticates the first device by performing the authentication procedure along with the first device at step S6070.

Step of Distribution Provisioning Data

When the first device is authenticated, the second device and the first device calculate and generate a session key.

Thereafter, the second device transmits provisioning data to the first device at step S6080.

The provisioning data may include an application key, a device key, a network key, an IV index and/or a Unicast address.

The first device that has received the provisioning data transmits a completion message to the second device. Accordingly, the provisioning procedure is terminated at step S6090.

FIG. 7 is a diagram showing an example in which a message is transmitted using flooding over a Bluetooth mesh network to which an embodiment of the present invention may be applied.

Hereinafter, a node that has generated a data packet is referred to as a "source node (SRC)", and a node, that is, the final destination of a data packet, is referred to as a "destination node (DST)."

As shown in FIG. 7, a method for transmitting, by a first node 200 that is a source node, data to a second device 400 that is a destination node through a flooding method is described in detail below. (a) If the first node 200 wants to transmit data to the second node 400 through a flooding method, the first node 200 broadcast a message, including the data, to neighboring nodes present at a hop distance in the advertising state.

(b) A relay node 1 300-1 that performs a relay function receives the message from the first node 200 in the scanning state, changes its state from the scanning state to the advertising state, and broadcasts the received message to neighboring nodes again.

At this time, the first node 200 changes its state to the sleep state after transmitting the message, and is thus incapable of receiving the message transmitted by the relay node 1 300-1.

(c) Thereafter, a relay node 2 300-2 and a relay node 3 300-3 that have received the message from the relay node 1 300-1 in the scanning state and that perform a relay function change their state to the advertising state, and broadcast the received messages to neighboring nodes again.

At this time, if the relay node 2 300-2 and the relay node 3 300-3 transmit the same messages to a relay node 4 300-4, the relay node 4 300-4 does not receive the message because a collision is generated between the messages.

If the messages transmitted by the relay node 2 300-2 and the relay node 3 300-3 are transmitted to the relay node 4 300-4 without a collision, the relay node 4 300-4 discards a message that belongs to the received messages and that has been received later based on a sequence number.

(d) The relay node 4 300-4 that has received the advertising message from the relay node 2 300-2 or the relay node 3 300-3 in the scanning state changes its state to the advertising state and broadcasts the message to neighboring nodes.

At this time, the second node 400 has already received the message from the relay node 2 300-2, but may receive the message from the relay node 4 300-4, that is, another link.

In this case, the second node 400 may discard the message received from the relay node 4 300-4.

As described above, if all of nodes forming a mesh network perform relay functions, a collision may be generated between messages due to the repeated retransmission of the relay nodes, making impossible the reception of data. Furthermore, there is a problem in that a source node has to retransmit a message in order to transmit the message to a relay node that has not received data due to a collision.

Furthermore, there is a problem in that traffic in a network is increased due to the unnecessary repeated and redundant transmission of a message although a collision is not generated between messages.

Accordingly, in order to solve such problems, an embodiment of the present invention provides a method for enabling or disabling the relay function of nodes through a network configuration and transmitting a message through a minimum number of relay nodes if a message is transmitted using flooding over a mesh network.

FIG. 8 is a diagram showing an example of a method for reducing the number of relay nodes in a Bluetooth mesh network to which an embodiment of the present invention may be applied.

FIGS. 8(a) and 8(b) show mesh networks, including relay nodes performing relay functions and non-relay nodes not performing a relay function. The relay node means a node whose relay function has been enabled or activated, and the non-relay node means a node whose relay function has been disabled or deactivated.

In FIG. 8(a), the relay functions of all of the nodes have been enabled. In this case, if data is transmitted based on flooding, all of the nodes of the mesh network receive and broadcast the data.

In this case, a collision may be generated between the data. Network performance is deteriorated due to the meaningless and repetitive transmission of the data. Furthermore, the complexity of the network is also increased.

FIG. 8(b) shows an example in which the relay functions of some of the nodes in FIG. 8(a) have been disabled.

In this case, a data collision probability is reduced because the relay functions of nodes that do not need to perform the relay functions are disabled. In FIG. 8(b), a relay node broadcasts data, received through scanning, to neighboring nodes again. A non-relay node discards a received data packet if the received data packet is not a data packet transmitted thereto (e.g., a destination address is not the address of the corresponding non-relay node).

In FIG. 8(b), the number of retransmitted data packets is reduced because the number of nodes that perform a relay function is reduced, and thus the probability that data packets may collide against each other is reduced.

In a mesh network, a user may directly configure nodes that perform relay functions by enabling or disabling the relay functions of the nodes, or nodes that perform relay functions may be automatically configured through the exchange of messages between the nodes.

In this case, nodes that perform relay functions may be automatically configured through the following methods.

First, when each node receives a command that instructs the configuration of a relay function in a specific cycle or through a control device, it transmits a first message for enabling or disabling relay functions to neighboring nodes at one hop distance.

An neighboring node that has received the first message transmits a second message for enabling or disabling a relay function to neighboring nodes through a back-off mechanism.

In this case, the first message and the second message may have the data format of FIG. 5. In the first and second messages, a TTL value may be set to '1'.

Each of the neighboring nodes includes the address of a node that has transmitted the first message to the corresponding node in the Payload field of the second message, and transmits the second message. Accordingly, information about nodes that are present at one hop distance and are capable of performing relay functions can be shared.

Thereafter, after a lapse of a specific time, each of nodes that have received the first message or the second message transmits an indication message indicative of the enabling of a relay function to a node that has first transmitted the first message or the second message to the corresponding node.

For example, in FIG. 8(b), if a node B sequentially receives a first message and a second message from a node K, a node H, a node I, and a node A, it may transmit an indication message to the node K.

A node that has received an indication message automatically enables its relay function. A node that has not received an indication message disables its relay function.

Such a method has advantages in that the probability that messages may collide against each other can be reduced by configuring nodes that perform relay functions in a Bluetooth mesh network and data traffic can be reduced because the meaningless and redundant transmission of a message is reduced.

FIG. 9 is a flowchart illustrating an example of a method for enabling or disabling the relay function of a node to which an embodiment of the present invention may be applied.

Referring to FIG. 9, when a node forming a Bluetooth mesh network receives a command in a specific cycle or from a control device, the node may enable or disable its relay function.

More specifically, when a first node receives a command to instruct the configuration of nodes that perform relay functions in a specific cycle or from a control device at step S9010, the first node transmits a message (i.e., a first message) for enabling (or activating) or disabling (or deactivating) a relay function to adjacent neighboring nodes at step S9020.

In this case, the message may be used to provide notification that the first node is present in a mesh network. Furthermore, the message may be called another name, such as a Heartbeat 1 message.

If the first node receives the command and transmits the message, it sets a timer after receiving the command from the control device and transmits the message.

The timer is indicative of a time interval at which the message is transmitted. The first node does not transmit a message for enabling or disabling a relay function again until the timer expires.

That is, although the specific cycle is reached or a command to instruct the configuration of nodes performing relay functions is received from the control device, the first node does not transmit a message for configuring the relay nodes to neighboring nodes until the timer expires.

The message may be configured as shown in FIG. 5, and each of the fields of the message may have the following value.

TTL: '1' (transmitted at one hop distance only)
Source Address: the address of the first node
Destination address: a broadcast address or multicast address within a plurality of nodes within a specific network
Payload:
OpCode: include a specific value indicative of a first message
Data: include data to be transmitted Thereafter, the first node enables or disables its relay function depending on whether an indication message (i.e., a first indication message) indicative of the enabling of at least one relay function is received from an neighboring node as a response to the message transmitted by the first node during the specific time (i.e., a first specific time) at step S9030 or S9040.

That is, when the first node receives at least one indication message during the specific time, it enables its relay function and plays the role of a relay node.

If the first node does not receive any indication message during the specific time, it disables its relay function and plays the role of a non-relay node.

Relay nodes can be configured by such a method. Accordingly, the probability that messages may collide against each other can be reduced, and data transmission efficiency can be improved because the meaningless retransmission of a message can be reduced.

FIG. 10 is a flowchart illustrating another example of a method for enabling or disabling the relay function of a node to which an embodiment of the present invention may be applied.

Referring to FIG. 10, when a node forming a Bluetooth mesh network receives a message for enabling or disabling a relay function from an neighboring node, the node may enable or disable its relay function.

More specifically, a first node receives at least one first message for enabling or disabling a relay function from an neighboring node at one hop distance at step S10010.

In this case, the first message may be used to provide notification that the neighboring node is present in a mesh network. Furthermore, the first message may be called another name, such as a Heartbeat 1 message.

After receiving the first message, the first node checks whether a message that belongs to received messages for enabling or disabling a relay function and that has the same SRC address as the first message is present.

If, as a result of the check, it is found that a message having the same SRC address as the first message is not present, the first node transmits a first indication message indicative of the enabling of a relay function to an neighboring node that belongs to neighboring nodes that have transmitted the at least one first message and that has first transmitted the first message at step S10020.

If another node has already transmitted a message indicative of the enabling of a relay function to an neighboring node that the first node has intended to transmit a first indication message, the first node may cancel the transmission of the first indication message.

Thereafter, the neighboring node that has received the first indication message enables its relay function and plays the role of a relay node.

The first node transmits a second message for enabling or disabling a relay function to adjacent neighboring nodes at one hop distance at step S10030.

In this case, the second message may be used to provide notification that the first node itself is present in the mesh network. Furthermore, the second message may be called another name, such as a Heartbeat 1 message.

Each of the first message and the second message may be configured as shown in FIG. 5, and each of the fields of the message may have the following value.

TTL: '1' (transmitted at one hop distance only)
Source Address: the address of the first node
Destination address: a broadcast address or a multicast address for a plurality of nodes within a specific network
Payload:
OpCode: include a specific value indicative of the first message
Data: include data to be transmitted The second message may include the address of an neighboring node that has transmitted the first message in the data field.

If the address of a node prior to an neighboring node that has transmitted the first message is included in the payload field of the first message, the first node may neglect the first message transmitted by the previous node in order to prevent the redundant configuration of a relay function.

For example, if a first node receives a first message from a relay node 1 and the relay node 1 receives a third message for enabling or disabling a relay function from a relay node 2, the payload field of the first message may include the address of the relay node 2.

In this case, when the first node is present at one hop distance from the relay node 2 and thus the relay node 2 also transmits a first message, the first node may neglect the first message transmitted by the relay node 2.

Thereafter, the first node enables or disables its relay function depending on whether an indication message (i.e., a second indication message) indicative of the enabling of at least one relay function is received from an neighboring node as a response to the second message during a specific time (i.e., a first specific time) at step S10040 or S10050.

That is, when the first node receives at least one second indication message within the specific time, it enables its relay function and plays the role of a relay node.

If the first node does not receive any second indication message within the specific time, however, it disables its relay function and plays the role of a non-relay node.

Each of the first indication message and the second indication message may have the packet format of FIG. 5, and each of the fields of the message may have the following value.

TTL: '1' (transferred up to one hop distance only)
Source Address: the address of a node that has transmitted an indication message
Destination address: the address of the first node
Payload:
OpCode: include a specific value indicative of the indication message FIG. 11 is a diagram showing an example of a method for enabling the relay function of a node depending on the conditions of an neighboring node to which an embodiment of the present invention may be applied.

Referring to FIG. 11, if a node having its relay function disabled and playing the role of a non-relay node does not have an neighboring node capable of performing a relay function, it may enable its relay function and play the role of a relay node.

More specifically, as shown in FIG. 11(a), a node A has its relay function disabled and plays the role of a non-relay node. Accordingly, if the address of a destination address is not the same as that of the node A, the node A discards a received message without relaying the received message to neighboring nodes.

If an neighboring node B does not perform a relay function or a node J joints a corresponding mesh network as shown in FIG. 8(b), the node A enables its relay function and plays the role of a relay node because there is no relay node that plays the role of a relay for relaying the message to the node J.

If such a method is used, when there is no neighboring node that performs a relay function or a new node joins a mesh network, the relay functions of some nodes can be enabled so that a message is relayed to a destination node.

FIG. 12 is a flowchart illustrating an example of a method for enabling the relay function of a node depending on the conditions of an neighboring node to which an embodiment of the present invention may be applied.

Referring to FIG. 12, if an neighboring node that performs a relay function is not present around a node, the node may enable the relay function of an neighboring node or may directly play the role of a relay node.

More specifically, if a first node first joins a mesh network or does not receive a message from an neighboring node during a specific time (i.e., a second specific time), it transmits a first request message for checking whether a relay function has been enabled to a plurality of neighboring nodes at one hop distance at step S12010.

In this case, the first request message may be called another name, such as a Heartbeat 2 message, and may have the packet format of FIG. 5.

Each of the fields of the first request message may have the following value.

TTL: '1' (transferred up to one hop distance only)
Source Address: the address of the first node
Destination address: a broadcast address or a multicast address for a plurality of nodes within a specific network (If a specific multicast address is used, nodes capable of performing relay functions in some network (e.g., a specific space or a specific function) other than the entire network can be checked)
Payload:
OpCode: include a specific value indicative of the first request message If nodes neighboring to the first node have their relay functions enabled and play the role of relay nodes, each of the nodes transmits a first response message, indicating that its relay function has been enabled and a corresponding node plays the role of a relay node, to the first node as a response to the first request message.

In this case, the first response message may be called another name, such as an Alive 2 message, and may have the packet format of FIG. 5.

Each of the fields of the first response message may have the following value.

TTL: '1' (transferred up to one hop distance only)
Source Address: the address of a node that transmits the first response message
Destination address: the address of the first node
Payload:
OpCode: include a specific value indicative of the first response message If the relay functions of neighboring nodes have been disabled, the neighboring nodes do not transmit a first response message to the first node.

If the first node receives a first response message from at least one of the neighboring nodes, however, it may be aware that there is a node playing the role of a relay node.

If the first node does not receive a first response message from the neighboring nodes, it may be aware that there is no node playing the role of a relay node.

In this case, the first node cannot receive a message from a node at a distance of more than one hop because there is no node playing the role of a relay node.

Furthermore, the first node cannot relay or transmit a message to a node at a distance of more than one hop because the relay function of the first node has also been disabled.

Accordingly, the first node transmits a second request message for checking whether a relay function can be performed to neighboring nodes in order to enable the relay functions of nodes that belong to neighboring nodes and that are capable of performing their relay functions at step S12020.

In this case, the second request message may be called another name, such as a Heartbeat 3 message, and may have the packet format of FIG. 5.

Each of the fields of the second request message may have the following value.

TTL: '1' (transferred up to one hop distance only)
Source Address: the address of the first node
Destination address: a broadcast address or a multicast address for a plurality of nodes within a specific network (If a specific multicast address is used, nodes capable of performing relay functions in some network (e.g., a specific space or a specific function) other than the entire network can be checked)
Payload:
OpCode: include a specific value indicative of the second request message If each of the neighboring nodes that have received the second request message can perform its relay function, it transmits a second response message to the first node in order to provide notification that it can perform the relay function.

In this case, the second response message may be called another name, such as an Alive 3 message, and may have the packet format of FIG. 5.

Each of the fields of the first response message may have the following value.

TTL: '1' (transferred up to one hop distance only)
Source Address: the address of a node that transmits the second response message
Destination address: the address of the first node
Payload:
OpCode: include a specific value indicative of the second response message If each of the neighboring nodes is incapable of performing its relay function, however, it does not transmit a second response message to the first node.

If the first node receives second response messages from one or more of the neighboring nodes, it selects a specific node whose relay function is enabled to play the role of a relay node from the one or more neighboring nodes that have transmitted the second response messages at step S12030.

The first node transmits a third indication message indicative of the enabling of a relay function to the selected specific node at step S12040.

In this case, the third indication message may be called another name, such as an Alive 1 message, and may have the same packet format as the first indication message of FIG. 10.

The selected specific node that has received the third indication message enables its relay function and may play the role of a relay node.

If the first node does not receive a second response message from the neighboring nodes, however, the first node determines whether it can play the role of a relay function.

If, as a result of the determination, it is determined that the first node can play the role of a relay function, the first node enables its relay function and may play the role of a relay node at step S12050.

If, as a result of the determination, it is determined that the first node cannot play the role of a relay function, the first node does not play the role of a relay node and continues to play the role of a non-relay node at step S12060.

If such a method is used, when a node first joins a mesh network and thus there is no relay node capable of playing the role of a relay node, the node may enable the relay function of an neighboring node or may directly enable its relay function and play the role of a relay node.

FIG. 13 is a diagram showing an example of a method for disabling the relay function of a node depending on the conditions of an neighboring node to which an embodiment of the present invention may be applied.

Referring to FIG. 13, if a node no longer needs to relay a message to neighboring nodes, it may disable its relay function and play the role of a non-relay node.

More specifically, as shown in FIG. 13(*a*), a node B plays the role of a relay node in order to relay messages transmitted to a node G and a node A.

However, if the node G and the node A deviate from a mesh network, the node B no longer needs to relay a message to the node G and the node A.

Accordingly, the node B disables its relay function and plays the role of a non-relay node because it no longer needs to play the role of a relay node.

If such a method is used, the configuration of relay nodes in a mesh network can be optimized because a relay function is disabled when the relay function is not required.

FIG. 14 is a flowchart illustrating an example of a method for disabling the relay function of a node depending on the conditions of an neighboring node to which an embodiment of the present invention may be applied.

Referring to FIG. 14, if a node no longer needs to play the role of a relay function, the node may disable its relay function and play the role of a non-relay node.

More specifically, a first node may monitor messages transmitted and received by a plurality of neighboring nodes at one hop distance, and may obtain information about neighboring nodes that belong to the plurality of neighboring nodes and that play the role of a relay node at step S14010.

For example, the first node may obtain information (e.g., the address of a node playing the role of a relay node) about neighboring nodes that belong to the plurality of neighboring nodes and that play the role of a relay node by monitoring the messages described with reference to FIGS. 9 to 12.

The first node may monitor messages transmitted and received by neighboring nodes until the number of nodes performing their relay functions becomes a specific number or more during a specific time.

If the specific time elapses or the number of nodes performing their relay functions becomes the specific number or more, the first node transmits a third request message to inquire about the disabling of the relay functions to the neighboring nodes at step S14020.

In this case, the third request message may also be called a sleep message, and may have the packet format of FIG. 5.

Each of the fields of the third request message may have the following value.

TTL: '1' (transferred up to one hop distance only)
Source Address: the address of the first node
Destination address: a broadcast address or a multicast address for a plurality of nodes within a specific network (If a specific multicast address is used, nodes capable of performing relay functions in some network (e.g., a specific space or a specific function) other than the entire network can be checked)
Payload:
OpCode: include a specific value indicative of the third request message
Data: the addresses of relay nodes (may include a plurality of pieces of information) including the addresses of neighboring nodes that have been obtained through monitoring and that play the role of relay nodes If the first node needs to play the role of a relay function, each of neighboring nodes that have received the third request message may transmit a third response message that requests the first node to perform a relay function.

For example, if the address of a node that has been obtained by each neighboring node through the transmission and reception of messages or monitoring and that plays the role of a relay node is identical with an address that belongs to the addresses of relay nodes included in the third request message, each of the neighboring nodes determines that the first node does not need to play the role of a relay function and does not transmit a third response message to the first node.

If the same address is not present, however, each of the neighboring nodes determines that the first node needs to play the role of a relay function and transmits a third response message to the first node.

That is, if a node whose relay function is enabled to play the role of a relay node is not present around the neighboring nodes, each of the neighboring nodes transmits a third response message to the first node because a message needs to be relayed by the first node.

If the third response message is transmitted from another node to the first node, each of the neighboring nodes may cancel the transmission of the third response message in order to prevent the redundant configuration of a relay function.

If a node whose relay function has been enabled to play the role of a relay node is present around the neighboring nodes other than the first node, however, each of the neighboring nodes does not transmit a third response message to the first node because a message can be relayed through another node other than the first node.

In this case, the third response message may be called another name, such as an Alive 4 message, and may have the packet format of FIG. 5.

Each of the fields of the third response message may have the following value.

TTL: '1' (transferred up to one hop distance only)
Source Address: the address of a node that transmits the third response message
Destination address: the address of the first node
Payload:
OpCode: include a specific value indicative of the third response message When the first node receives the third response message from at least one of the neighboring nodes, it continues to perform the relay function at step S14030.

If the first node does not receive a third response message from the neighboring nodes, however, it disables its relay function and plays the role of a non-relay node at step S14040.

If such a method is used, the number of nodes playing the role of relay nodes can be reduced by disabling relay functions if a relay function does not need to be performed. Furthermore, a data collision probability and data traffic in a mesh network can be reduced by reducing the number of nodes that play the role of relay nodes.

FIG. 15 is a diagram showing an example of a method for manually enabling or disabling the relay function of a node to which an embodiment of the present invention may be applied.

Referring to FIG. 15, a user may manually enable or disable the relay functions of nodes forming a mesh network.

More specifically, (a) a mesh network has been separated into two network because a node B does not perform a relay function in the mesh network. That is, if nodes F, E, D, and C cannot transmit messages to nodes G, A and/or J because the node B does not perform the relay function, the nodes G, A, and J cannot transmit messages to nodes I, H, K, F, E, D, and C.

In this case, a user may check whether a relay function is performed by searching for nodes forming a mesh network, as shown in FIG. 15(*a*).

(b) After checking whether the relay functions of nodes are performed, the user may enable a specific node to play the role of a relay node through a button (or icon) capable of enabling a relay function.

That is, the user may enable the relay function of the node B by selecting the non-relay button (or icon) of the node B shown in FIG. 15(*a*) and changing a non-relay into a relay as shown in FIG. 15(*b*).

In accordance with another embodiment of the present invention, a user may disable a relay function by selecting a rely button (or icon) and changing a relay into to a non-relay.

In this case, the button (or icon) capable of enabling or disabling a relay function may have various forms. For example, a relay function may be enabled or disabled through a method, such as a check box or a slide.

If such a method is used, the relay functions of nodes can be manually enabled or disabled.

FIG. 16 is a flowchart illustrating another example of a method for enabling or disabling the relay function of a node to which an embodiment of the present invention may be applied.

Referring to FIG. 16, when a specific event is generated at step S16010, a first node transmits a first message for enabling (or activating) or disabling (or deactivating) its relay function to a plurality of neighboring nodes at step S16020.

In this case, the specific event may be any one of the arrival of a specific cycle, the reception of a command indicative of the configuration of a relay function from a control device, and the reception of a second message for activating or deactivating a relay function from an neighboring node, which have been described with reference to FIGS. 9 and 10.

The first message and the second message may have the same packet format as the first message and second message of FIGS. 9 and 10.

The first node may enable or disable its relay function depending on whether a first indication message to request the activation of the relay function is received from at least one of the plurality of neighboring nodes as a response to the first message within a specific time (i.e., a first specific time).

That is, when the first node receives a first indication message from at least one neighboring node within the specific time, it enables its relay function and plays the role of a relay node at step S16040.

If the first node does not receive a first indication message from the plurality of neighboring nodes within the specific time, however, the first node disables its relay function and plays the role of a non-relay node at step S16050.

In this case, the first indication message may have the same packet format as the first indication message described with reference to FIGS. 9 and 10.

This specification relates to Bluetooth data transmission and reception and, more particularly, to a method and apparatus for transmitting a message using flooding over a Bluetooth mesh network.

Furthermore, the drawings have been divided and described for convenience of a description, but the embodiments described with reference to the drawings may be merged to implement one or more new embodiments. Furthermore, the range of right of the present invention also includes designing a computer-readable recording medium in which a program for executing the aforementioned embodiments has been written according to the needs of those skilled in the art.

The configurations and methods of the aforementioned embodiments are not limited and applied, and the embodiments may be constructed by selectively combining some or all of the embodiments so that they are modified in various ways.

The method according to this specification may be implemented in a recording medium, readable by a processor included in a network device, in the form of code readable by a processor. The processor-readable recording medium includes all types of recording devices in which data readable by a processor is stored. The recording medium may include ROM, RAM, CD-ROM, magnetic tapes, floppy disks, and optical data storages, for example. Furthermore, the processor-readable recording medium may be distributed to computer systems connected over a network, and the processor-readable code may be stored and executed in a distributed manner.

Furthermore, although some embodiments of this specification have been illustrated and described above, this specification is not limited to the aforementioned specific embodiments, and a person having ordinary skill in the art to which this specificaiton pertains may modify the present invention in various ways without departing from the gist of the claims. Such modified embodiments should not be individually interpreted from the technological spirit or prospect of this specification.

Furthermore, in this specification, both the device invention and the method invention have been described, but the descriptions of both the inventions may be complementally applied, if necessary.

In accordance with the method for transmitting and receiving data over a Bluetooth mesh network according to an embodiment of the present invention, there is an advantage in that a node can transmit and receive data through one or more relay nodes.

Furthermore, in accordance with an embodiment of the present invention, there is an advantage in that the probability that data may collide against each other can be reduced because the number of relay nodes for relaying a message is reduced if the message is transmitted or received over a Bluetooth LE mesh network.

Furthermore, in accordance with an embodiment of the present invention, there is an advantage in that an increase of network traffic generated when data is transmitted or received using flooding can be reduced because a relay function is activated or deactivated, if necessary.

Furthermore, in accordance with an embodiment of the present invention, there is an advantage in that the delay of the transmission of a message and network performance can be improved because the probability that data may collide against each other is reduced.

Furthermore, in accordance with an embodiment of the present invention, user convenience can be improved because nodes performing a relay function can be configured through the exchange of messages between devices.

Advantages which may be obtained by the present invention are not limited to the aforementioned advantages, and various other advantages may be evidently understood by those skilled in the art to which the present invention pertains from the following description.

What is claimed is:

1. A method for performing, by a first node, a relay function in a Bluetooth mesh network, the method comprising:
transmitting, by a transceiver, a first message for activating or deactivating the relay function of the first node to a plurality of neighboring nodes when a specific event is generated;
activating or deactivating, by a processor, the relay function of the first node depending on whether a first indication message that requests activation of the relay function of the first node is received or not in a response to the first message within a first specific time from at least one of the plurality of neighboring nodes,
wherein the specific event is one of receiving a command from a control device indicating a setting of the relay function of the first node, a specific cycle, or receiving a second message for activating or deactivating the relay function of the first node from the plurality of neighboring nodes;
obtaining, by the processor, information related to relay nodes, among the plurality of neighboring nodes, with their relay functions activated through messages transmitted and received from the plurality of neighboring nodes; transmitting, by the transceiver, a first request message to the plurality of neighboring nodes based on the obtained information related to the relay nodes to inquire whether to deactivate the relay function of the first node, wherein the first request message includes addresses of the relay nodes; and deactivating, by the processor, the relay function of the first node, when the relay function of the first node is activated, depending on whether a first response message that requests execution of the relay function of the first node is received or not from one or more of the plurality of neighboring nodes as a response to the first request message.

2. The method of claim 1, further comprising:
activating a specific timer after transmitting the first message, when the specific event is one of the specific cycle or receiving the second message,
wherein the specific timer indicates a time for a retransmission of the first message.

3. The method of claim 1, further comprising:
transmitting a second indication message that requests activation of a relay function of a specific neighboring node among the plurality of neighboring nodes to the specific neighboring node when the specific event is receiving the second message,
wherein the specific neighboring node is a neighboring node that first transmitted the second message, and
wherein the first message includes an address of the specific neighboring node.

4. The method of claim 1, wherein the first node deactivates the relay function of the first node when the first indication message is not received within the first specific time.

5. The method of claim 4, further comprising:
transmitting a second request message for checking whether or not to activate the relay function of the first node to the plurality of neighboring nodes when a message is not received from the plurality of neighboring nodes within a second specific time.

6. The method of claim 5, further comprising:
receiving, in response to the second request message, a second response message from a particular one of the plurality of neighboring nodes that indicates activation of a relay function of the particular one of the plurality of neighboring nodes.

7. The method of claim 5, further comprising:
transmitting a third request message for checking whether a relay function of one or more of the plurality of neighboring nodes is capable of being performed to the plurality of neighboring nodes when a response to the second request message is not received.

8. The method of claim 7, further comprising:
receiving a third response message indicating that the relay function of the one or more of the plurality of neighboring nodes is capable of being performed from the one or more of the plurality of neighboring nodes in a response to the third request message;
selecting a specific neighboring node to activate the relay function of the one or more of the plurality of neighboring nodes; and
transmitting a third indication message for requesting the activation of the relay function of the one or more of the plurality of neighboring nodes to the specific neighboring node.

9. The method of claim 7, further comprising activating the relay function of the first node depending on whether the relay function of the first node is capable of being activated or not if a response to the third request message is not received from the one or more of the plurality of neighboring nodes.

10. The method of claim 1, wherein the first node activates the relay function of the first node when the first indication message is received within the specific time.

11. The method of claim 1, wherein the first node deactivates the relay function when the first response message is not received.

12. The method of claim 1, wherein the first node performs the relay function when the first response message is received.

13. A first node for performing a relay function in a Bluetooth mesh network, the first node comprising:
a communication unit configured to communicate in a wireless or wired manner,
a memory for storing data; and
a processor functionally connected with the communication unit,
wherein the processor is configured to:
transmit a first message for activating or deactivating the relay function of the first node to a plurality of neighboring nodes when a specific event is generated,
activate or deactivate the relay function of the first node depending on whether a first indication message that requests activation of the relay function of the first node is received or not in a response to the first message within a first specific time from at least one of the plurality of neighboring nodes,
wherein the specific event is one of receiving a command from a control device indicating a setting of the relay function of the first node, a specific cycle, or receiving a second message for activating or deactivating the relay function of the first node from the plurality of neighboring nodes,
obtain information related to relay nodes, among the plurality of neighboring nodes, with their relay functions activated through messages transmitted and received from the plurality of neighboring nodes,
transmit a first request message to the plurality of neighboring nodes based on the information related to the relay nodes to inquire whether to deactivate the relay function of the first node,
wherein the first request message includes addresses of the relay nodes, and
deactivate the relay function of the first node, when the relay function of the first node is activated, depending on whether a first response message that requests execution of the relay function of the first node is received or not from one or more of the plurality of neighboring nodes as a response to the first request message.

* * * * *